United States Patent [19]
Schröder et al.

[11] Patent Number: 5,988,065
[45] Date of Patent: Nov. 23, 1999

[54] DEVICE FOR CONTROLLING SUCTION AIR OR VACUUM AND METHOD OF ACTUATING THE DEVICE

[75] Inventors: Raimund Schröder, Hockenheim; Rudi Haupenthal, Epfenbach; Karl-Heinz Helmstädter, Sinsheim; Hans-Peter Hiltwein, Wagenhäusel; Roland Krupp, Neulussheim, all of Germany

[73] Assignee: Heidelberger Druckmaschinen AG, Heidelberg, Germany

[21] Appl. No.: 09/071,796

[22] Filed: May 4, 1998

[30] Foreign Application Priority Data

May 2, 1997 [DE] Germany .............. 197 18 558

[51] Int. Cl.$^6$ .................................... B41F 25/00
[52] U.S. Cl. ...................... 101/389.1; 101/232
[58] Field of Search ............... 101/389.1, 232; 269/21; 279/3; 451/494; 271/276

[56] References Cited

U.S. PATENT DOCUMENTS 4,145,040  3/1979  Huber ...................... 271/276
4,202,542  5/1980  Lammers et al. .......... 271/276

*Primary Examiner*—Edgar Burr
*Assistant Examiner*—Daniel J. Colilla
*Attorney, Agent, or Firm*—Herbert L. Lerner; Laurence A. Greenberg

[57] ABSTRACT

A device for controlling vacuum applied to suction openings formed in a cylinder, the suction openings being connectable to a vacuum source via valves arranged in rows and assigned to the suction openings, includes a rotatable adjusting shaft carrying adjusting elements assigned to the valves, the adjusting elements serving to actuate the valves in a defined sequence when the adjusting shaft is rotated, the valves having adjusting bodies therein movable by the adjusting elements out of a first switching position of the adjusting bodies into a second switching position thereof, the vacuum applied to the suction openings being of different magnitudes in the first and the second switching positions; and a method for incrementally actuating the vacuum-controlling device.

21 Claims, 3 Drawing Sheets

DEVICE FOR CONTROLLING SUCTION AIR OR VACUUM AND METHOD OF ACTUATING THE DEVICE

BACKGROUND OF THE INVENTION

FIELD OF THE INVENTION

The invention relates to a device for controlling suction air or vacuum which, more particularly, is applied to suction openings of a cylinder of a printing press, and a method of actuating the control device. In particular, the invention relates to a device for opening up and closing off suction lines to sheet transfer drums having suction grippers in sheet-fed rotary offset printing presses.

Suction-air controlling devices of this general type offer a possibility of guiding small-format sheets of printing stock on a variable-format cylinder disposed between two printing units and equipped with a row of suction grippers designed for the maximum format, aspiration of faulty air through openings of the suction grippers not covered by the small-format sheets of printing stock being thereby avoided. In this manner, high energy consumption and undesirably low efficiency, respectively, the aspiration of relatively large contaminating particles, and increased noise emissions during printing press operation are avoided.

In the Published, Non-Examined German Patent Application (DE-OS) 42 17 851, a device for feeding and blocking or checking suction air in turning drums is proposed wherein, as a central blocking element, there is provided a control shaft, which is guided and rotatably disposed in an axial bore and has control channels arranged on the circumference thereof. The control channels correspond with vertical bores formed in a rocker shaft and a crossbar and terminate in the suction heads.

A disadvantage of this arrangement is that it requires either a special manufacturing process, wherein an epoxy resin is introduced into the axial bore, or a conventional but very expensive or cost-intensive production process because of the high precision required.

The invasion of contaminants, especially paper particles, into blocking devices or suction-air or vacuum controls in machines, i.e. presses, for processing printing stock is unavoidable when in use. If these contaminants become stuck in sliding guides and air ducts, they can cause functional impairments, such as seizing, binding upon actuation, or plugging up of small-diameter air ducts. In this respect, such devices, for example, like those described hereinabove, which require very high precision because of their construction, are especially vulnerable. Because there is only one sealing point in the vacuum control, contamination aspirated from a plurality of suction heads can lead to an accumulation at this critical point, especially since the components that form the sealing point are moved only seldom towards one another, e.g., upon a change of format, and thus any contaminants that have become stuck there are barely able to be detached. Consequently, maintenance intervals have to be shorter, and cleaning and the elimination of problems always involve extensive dismantling of device elements.

The Japanese Published, Non-Examined Patent Application JP 4-153039 describes a suction apparatus at the transfer cylinder of printing presses which contains a first tube having a wall wherein openings are formed that are assigned to air ducts discharging into suction openings. By rotational actuation of the first tube, which is disposed in a second tube, the air ducts branching off from the second tube can be opened and closed, causing the openings in the first tube to coincide with the intersection openings of the branching air ducts in the second tube. Because, in this apparatus, the diameter and thus the circumference of the tubes which are formed with the valve openings cannot as a rule be selected to be arbitrarily large, for reasons of structural space, the number of suction openings that can be blocked off and disposed over the cylinder width is very restricted. Moreover, this apparatus again has the problem of malfunctions caused by soiling.

SUMMARY OF THE INVENTION

Starting from the state of the prior art and the inadequacies of heretofore known embodiments of the foregoing general type, it is an object of the invention to provide a device for controlling suction air or vacuum applied to suction openings of a cylinder of a printing press which can be produced economically, requires little maintenance, and has a trouble-free operation.

With the foregoing and other objects in view, there is provided, in accordance with one aspect of the invention, a device for controlling vacuum applied to suction openings formed in a cylinder, the suction openings being connectable to a vacuum source via valves arranged in rows and assigned to the suction openings, comprising a rotatable adjusting shaft carrying adjusting elements assigned to the valves, the adjusting elements serving to actuate the valves in a defined sequence when the adjusting shaft is rotated, the valves having adjusting bodies therein movable by the adjusting elements out of a first switching position of the adjusting bodies into a second switching position thereof, the vacuum applied to the suction openings being of different magnitudes in the first and the second switching positions.

In accordance with another feature of the invention, the control device includes a firm restraint for holding the adjusting shaft in preferential angular positions.

In accordance with a further feature of the invention, the control device includes a step-by-step motion linkage for actuating the adjusting shaft.

In accordance with an added feature of the invention, the step-by-step motion linkage is disposed on the cylinder, and the control device includes a drive external to the cylinder for actuating the step-by-step motion linkage.

In accordance with an additional feature of the invention, the step-by-step motion linkage is embodied as a geared step-by-step motion linkage, which includes a ratchet wheel and a pawl.

In accordance with yet another feature of the invention, the control device includes a first engagement element force-transmittingly connected to the adjusting shaft and disposed on the cylinder eccentrically to the cylinder axis, and a second engagement element disposed on a component external to the cylinder, the first engagement element and the second engagement element being bringable into engagement with one another, so that when the cylinder rotates, the first engagement element revolves about the cylinder axis and is actuated by the second engagement element.

In accordance with yet a further feature of the invention, the first engagement element is embodied as a ratchet wheel, and the second engagement element as a pawl.

In accordance with yet an added feature of the invention, the ratchet wheel is force-transmittingly connected to the adjusting shaft and is disposed on the cylinder coaxially with the cylinder axis, and the pawl is disposed on a component external to the cylinder, the pawl being bringable into engagement with the ratchet wheel, so that when the cylinder rotates, the ratchet wheel rotates therewith and is actuated by the pawl.

In accordance with yet an additional feature of the invention, the control device includes a remotely-controllable adjusting device for bringing the second engagement element into at least a first operating position wherein the second engagement element is engageable in the first engagement element.

In accordance with still another feature of the invention, the control device includes a remotely-controllable adjusting device for bringing the pawl into at least a first operating position wherein the pawl is engageable in the ratchet wheel.

In accordance with still a further feature of the invention, the adjusting device includes a pneumatic cylinder and at least one lever.

In accordance with still an added feature of the invention, the valves have a valve housing formed with a hollow chamber, and the adjusting body is formed as a displaceable valve body disposed in the hollow chamber, and the control device includes at least one line communicating with the suction openings and at least one line communicating with the vacuum source, the lines forming intersection openings terminating in the hollow chamber, the valve body, in the first switching position, covering a major part of the area or the entire area of at least one of the intersection openings and, in the second switching position, covering a minor part of the area or no part of the area of the at least one intersection opening, the valve body being actuatable by the adjusting element.

In accordance with still an additional feature of the invention, the adjusting elements are embodied as cams.

In accordance with another aspect of the invention, there is provided in a printing press, a device for controlling vacuum applied to suction openings of a printing-press cylinder, the suction openings being connectable to a vacuum source via valves arranged in rows and assigned to the suction openings, comprising a rotatable adjusting shaft carrying adjusting elements assigned to the valves, the adjusting elements serving to actuate the valves in a defined sequence when the adjusting shaft is rotated, the valves having adjusting bodies therein movable by the adjusting elements out of a first switching position of the adjusting bodies into a second switching position thereof, the vacuum applied to the suction openings being of different magnitudes in the first and the second switching positions.

In accordance with a further aspect of the invention, there is provided a method for incrementally actuating a device for controlling vacuum applied to suction openings formed in a cylinder, which comprises: adjusting at least one of a first and a second operative element into an operating position wherein an intermittent cooperation of the operative elements is effected when the cylinder is rotated; rotating the cylinder through a defined number of revolutions; and causing the second operative element to actuate the first operative element in accordance with the number of revolutions of the cylinder.

In accordance with a concomitant aspect of the invention, there is provided a method for incrementally actuating a device for controlling vacuum applied to suction openings of a printing-press cylinder, the method being performed by an actuating device comprising a first operative element disposed on the cylinder for actuating the control device, and a second operative element disposed externally to the cylinder, at least one of the first and the second operative elements being adjustable into operating positions wherein an intermittent cooperation of the operative elements can be effected when the cylinder is rotating, which comprises: adjusting at least one of the first and the second operative element into an operating position wherein an intermittent cooperation of the operative elements is effected when the cylinder is rotated; rotating the cylinder through a defined number of revolutions; and causing the second operative element to actuate the first operative element in accordance with the number of revolutions of the cylinder.

It is noted that each valve is assigned to at least one suction opening. The suction openings are connected to a vacuum source, and the vacuum can be applied permanently or intermittently to the suction openings, for example, as a function of the rotational angle of the cylinder. The air flow rate can be controlled in the form of a complete opening and closure of the valves. However, throttling of the air flow by the valves can also be effected, in particular, by providing an additional third switching position. The order in which the valves are actuated can be defined in the manufacture of the device. Alternatively, provision may also be made for each adjusting element to be fixed in a plurality of angular positions on the adjusting shaft, so that at any time it is possible to vary the order in which the valves are actuated. The adjusting bodies may be formed as parts which are internal to the valve housing, as valve bodies that vary the air flow, or as closure parts. It is possible to construct the adjusting body as a component external to the valve housing, which does not directly block off or throttle the flow and which is moved by the adjusting element, for example, rotated, swiveled, or displaced linearly, out of a first switching position into a further switching position, and which moves a valve body internal to the valve housing either directly or via such intermediate elements as levers or axes.

One considerable advantage of the invention is the great variability with regard to the requirement of special applications. The control device according to the invention can be integrated into various machine systems without material structural changes. By selectively fastening the adjusting elements to the adjusting shaft, the applications-dictated order of actuation of the valves and the order of shutoff or connection of the suction openings, respectively, from or to the vacuum source can be varied. For example, a staggered shutoff of suction openings in one row thereof can be provided, beginning at one end of the row and progressing in a direction to the other end thereof, or a shutoff of suction openings in pairs can be provided, beginning at both ends of the row of suction openings, or every other suction opening or every third suction opening, and so forth, in a row may be taken out of operation, or suction openings at given positions in arrangements of suction openings extending over a large surface and in matrix form, respectively, can be opened and closed. Because, instead of a complicated central closure element with high-precision fitting, a plurality of simple noncentralized closure elements are provided in the device of the invention, economical production is possible. The vulnerability of the device to malfunction is low; maintenance intervals can be selected to be long; and maintenance can be done without problems. If a single valve should stop up, the malfunction can be rapidly eliminated without requiring dismantling of the entire system. In a preferred embodiment of the valves, the valve body can be removed, so that the valve interior which is to be cleaned is readily accessible. It is possible to actuate the control device by hand, but it is advantageous to provide for automated actuation, for example, via control motors or step-by-step motors or by a method yet to be described herein.

The range of use of the device according to the invention is wide. The control device can be built into printing presses and machines that handle material to be printed and can be employed in processing printing materials in both web and sheet form. Within the entire process, the device according to the invention can be integrated into machines that precede the actual printing, such as in sheet feeders, and in further processing machines such as folding equipment which follows the printing. What is noted hereinabove regarding the range of use of the device of the invention applies equally to the method, described hereinbelow, for actuating the control device.

The device of the invention can also be used to control streams of blown or blast air. To that end, instead of the vacuum source, an overpressure source should be provided. A plurality of sources may be provided, so that, for example, the openings can be acted upon by blown or blast air and suction at alternating times and/or locations. A plurality of valves may be associated with one opening, so that the opening can be selectively connected to various sources.

It is advantageous to actuate the control device incrementally by a method wherein the actuating device comprises a first operative element disposed on the cylinder and actuating the control device, and a second operative element disposed externally to the cylinder, the first operative element and/or the second operative element being adjustable into operating positions wherein an intermittent cooperation of the operative elements can be effected upon a rotary motion of the cylinder. In a first method step, the first or second or both operative elements are adjusted into operating positions wherein, upon a rotary motion of the cylinder, an intermittent cooperation of the operative elements can be effected. In the following second method step, the cylinder is rotated and in the process executes a defined number of revolutions. In the third method step, as a function of the cylinder revolutions, the first operative element is actuated by the second operative element. Once these method steps have been performed, the first and/or second operative element can be returned to an initial position.

The first operative element is or can be connected to the adjusting shaft in a force-transmitting manner, and the second operative element can be disposed on a side wall of the printing press. The cooperation of the operative elements can be effected mechanically, by interengagement of the operative elements. Nonmechanical cooperation can also be provided; for example, a magnetic force can become operative between the operative elements, thus enabling contact-free actuation of the first operative element by the second operative element. The rotation of the cylinder can be performed by hand, by a central machine drive mechanism, or by a noncentral drive mechanism, such as the individual drive mechanism of one printing unit, which is assigned to the overall machine. The cylinder can be rotated in various rotational directions selectively and also alternatively.

Other features which are considered as characteristic for the invention are set forth in the appended claims.

Although the invention is illustrated and described herein as embodied in a device for controlling suction air or vacuum and a method of actuating the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
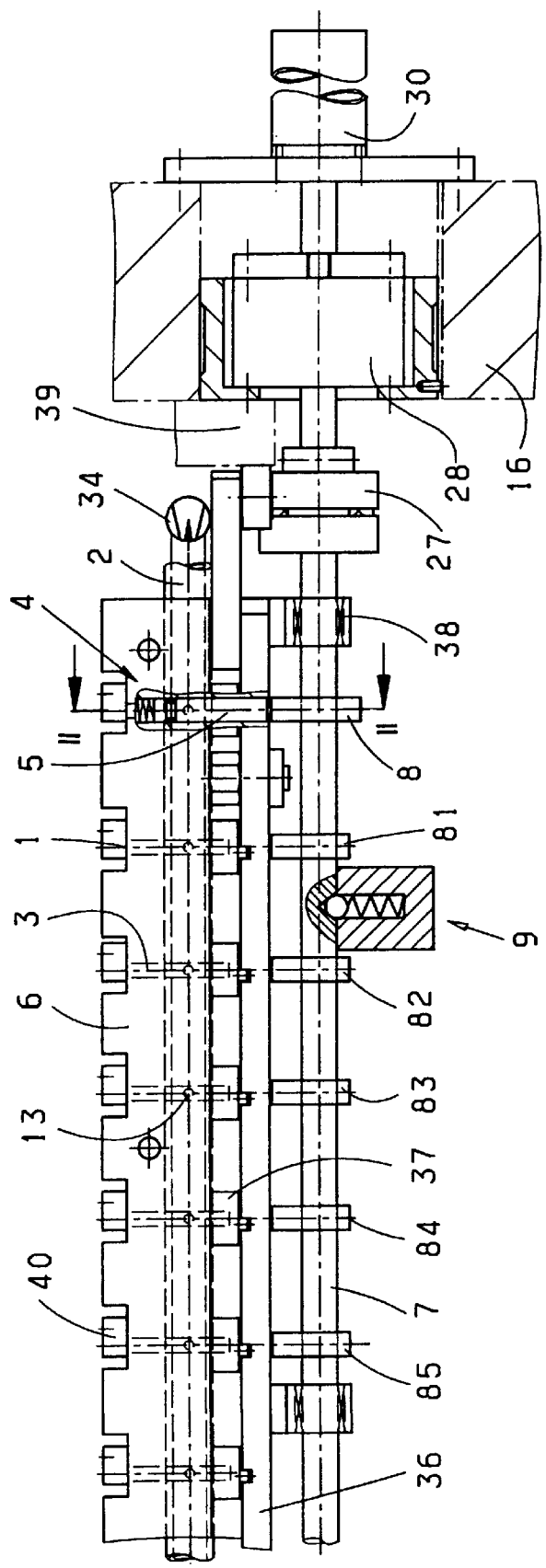
FIG. 1 is a fragmentary longitudinal sectional view of the device according to the invention for controlling suction air or vacuum applied to suction openings of a cylinder.

Referring now to the drawings and, first, particularly to FIG. 1 thereof, there is shown therein the device according to the invention for controlling suction air or vacuum applied to suction openings 1 of a cylinder 14 (FIG. 3), the suction openings 1 being connected to a vacuum source 34 via a line system that includes a main line 2, secondary lines 31 (FIG. 2) branching off therefrom, and secondary lines 3 leading to the suction openings 1. The suction openings 1 and the secondary lines 3 may be locally fixed in position, as illustrated, or may be positionable or may be continuously movable during operation. The lines 2, 3 and 31 are preferably embodied as rigid, stationary channels, ducts or tubes but may also be constructed as flexible, hose-like lines. The suction openings 1 may be formed as rotary suckers or suction devices 40 known heretofore from the prior art, which do not merely perform or exert an action that engages and holds the sheet but also that smoothes and tautens the sheet. The rotary suckers 40 may be moved by eccentrics 37, shifter or switching rods 36 and axial cams 39. The suction openings 1 have valves 4 assigned thereto, preferably one valve 4 being provided for each suction opening 1. The valves 4 are disposed in a row and are advantageously incorporated into a suction strip functioning as a common valve housing 6, however, they may also each have separate valve housings 6 and may be disposed adjacent to yet spaced apart from one another. The valves 4, respectively, include an adjusting body 5, which may be constructed as a linearly displaceable valve body in the interior of the valve 4.

The control device further includes an adjusting shaft 7, which is guided in bearings 38 and carries adjusting elements 8 associated with the valves 4. Provision may be made for the adjusting shaft 7 to be rotated in a first and a second rotational direction upon actuation of the valves 4. It is also possible for the adjusting shaft 7 to rotate in only one rotational direction.

In the advantageous embodiment of the adjusting elements 8 which are illustrated, they are embodied as cams, thereby assuring continuous contact between the adjusting elements 8 and the adjusting body 5. The adjusting elements 8 formed as cams, for example, cams of like construction for all of the valves 4, contact the adjusting body 5 only in preferential rotary-angle positions.

The control device according to the invention may be equipped with a firm restraint 9, by which the adjusting shaft 7 can be retained in preferential rotary angle positions. The firm restraint 9 is advantageously embodied as a multiple detent acting on both sides thereof and, furthermore, recesses, such as detent grooves or bores, for example, are formed in the cylinder shaft or in a detent element connected thereto and arranged in rotationally symmetrical alignment, and spring-supported or resilient inhibiting or restraining parts, such as spring-supported balls, are engageable in the recesses. When the adjusting shaft 7 is actuated, for example, by a step-by-step motion linkage for actuating the adjusting shaft 7, a force which overcomes the limit force of the detent action when the detent position is undone is transmitted to the adjusting shaft 7. Other restraints may also be used, in particular, form-restraints, or latching members, especially form-latching members, which are effective due to the shape or form thereof. In addition, the adjusting elements 8 may be embodied as detent parts, and the adjusting bodies 5 may be embodied as restraining parts. To that end, extra detent recesses may be provided in the cam geometry of the adjusting elements 8, the adjusting bodies 5 engaging in the extra detent recesses. The adjusting shaft 7 may, however, also be retained solely by static friction between the adjusting elements 8 and the adjusting bodies 5. In that case, a sufficiently large force generated by the springs 12 plays a major role. Instead of a firm restraint 9, the adjusting shaft 7 may be actuated by a self-locking or irreversible gear, such as a worm gear, for example. In the preferred embodiment of the invention shown in FIG. 1, in a condition of continuous contact between the adjusting element 8 and the adjusting body 5, the latter is also jointly held in the switching positions by the adjusting element 8. Provision may also be made for the adjusting elements 8 embodied as cams to briefly contact the adjusting bodies 5 within a limited rotary-angle range of the adjusting shaft 7 and, in so doing, switch the valves 4. Between the switching events, the valves 4 maintain whatever their current switching status may be. To that end, one locking and clamping mechanism per valve 4 can be provided, similar to that of electric key switches.

Figure 2:
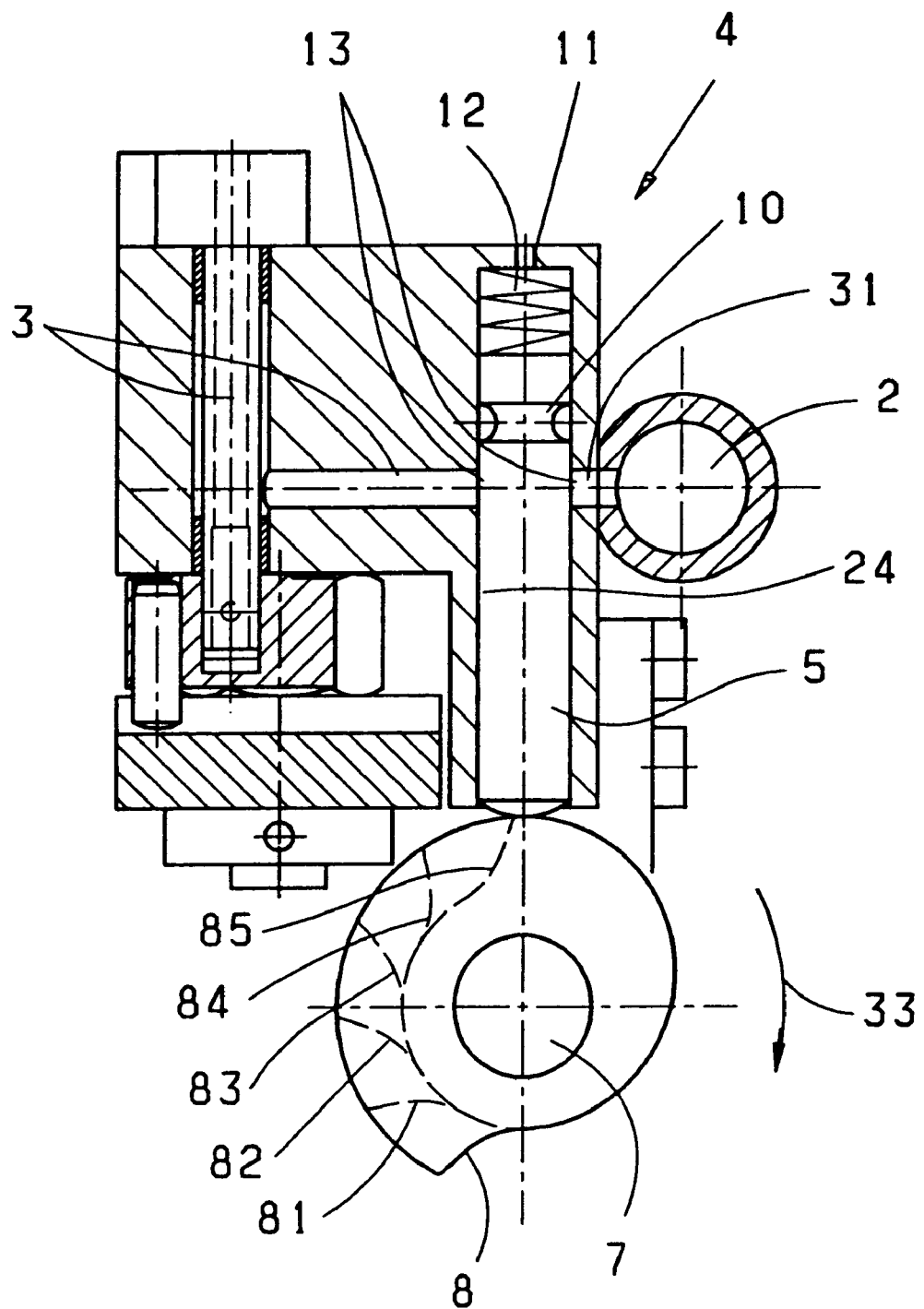
FIG. 2 is an enlarged cross-sectional view of FIG. 1 taken along the line II—II in the direction of the arrows and showing in greater detail an advantageous construction of valves forming part of the control device.

In FIG. 2, an especially advantageous feature of the valves 4 is shown in cross-sectional view. The internal valve body acting as an adjusting body 5 is constructed as a piston, which is divided into two parts by an annular groove 10. A hollow chamber 24 formed in the respective valve 4 is formed as a valve bore, wherein the piston 5 is displaceably guided, the chamber 24 having a venting bore 11. A spring 12 disposed in the valve bore 24, on the one hand, assures permanent contact between the piston 5 and the adjusting element 8 embodied as a cam disk and, on the other hand, adjusts the piston 5 out of a first switching position, shown in FIG. 2, back into a second non-illustrated switching position. In the first or "closed" switching position, the annular groove 10 is not aligned with the opposed intersection openings 13 of the lines 3, 31 that feed-in and remove air. Both intersection openings 13 are completely covered by the piston 5. In the second or "open" switching position, the annular groove 10 is in alignment with the two intersection openings 13, so that an air flow between the intersection openings 13 is possible via the annular groove 10. A stagewise throttling valve 4 may have more than one intersection opening 13, which terminates in the hollow chamber 24, from lines 3 and 31 that supply and/or remove air, in which case more than two switching positions are provided and, in a second and other switching positions, a different number of intersection openings 13 is uncovered. In addition, other valve constructions may also be provided, for example, wherein frustoconical valve bodies are lifted away from valve seats (lifting valves), tubular or cylindrical valve bodies (stopcocks or faucets) are turned, or valve bodies embodied as hinged flaps are pivoted, in order to vary the air flow. The cam disks, respectively, shown in FIG. 2 have two cam parts which merge with one another and correspond to the switching positions, one of the cam parts being formed, for example, as an epicycloid or spiral. In FIG. 2, an advantageous embodiment of the geometry of the cams 8, 81, 82, 83, 84, 85 assigned to the valves 4 can also be seen, wherein the valves 4 disposed side by side or parallel to one another are actuated successively, so that a staggered actuation takes place.

Figure 3:
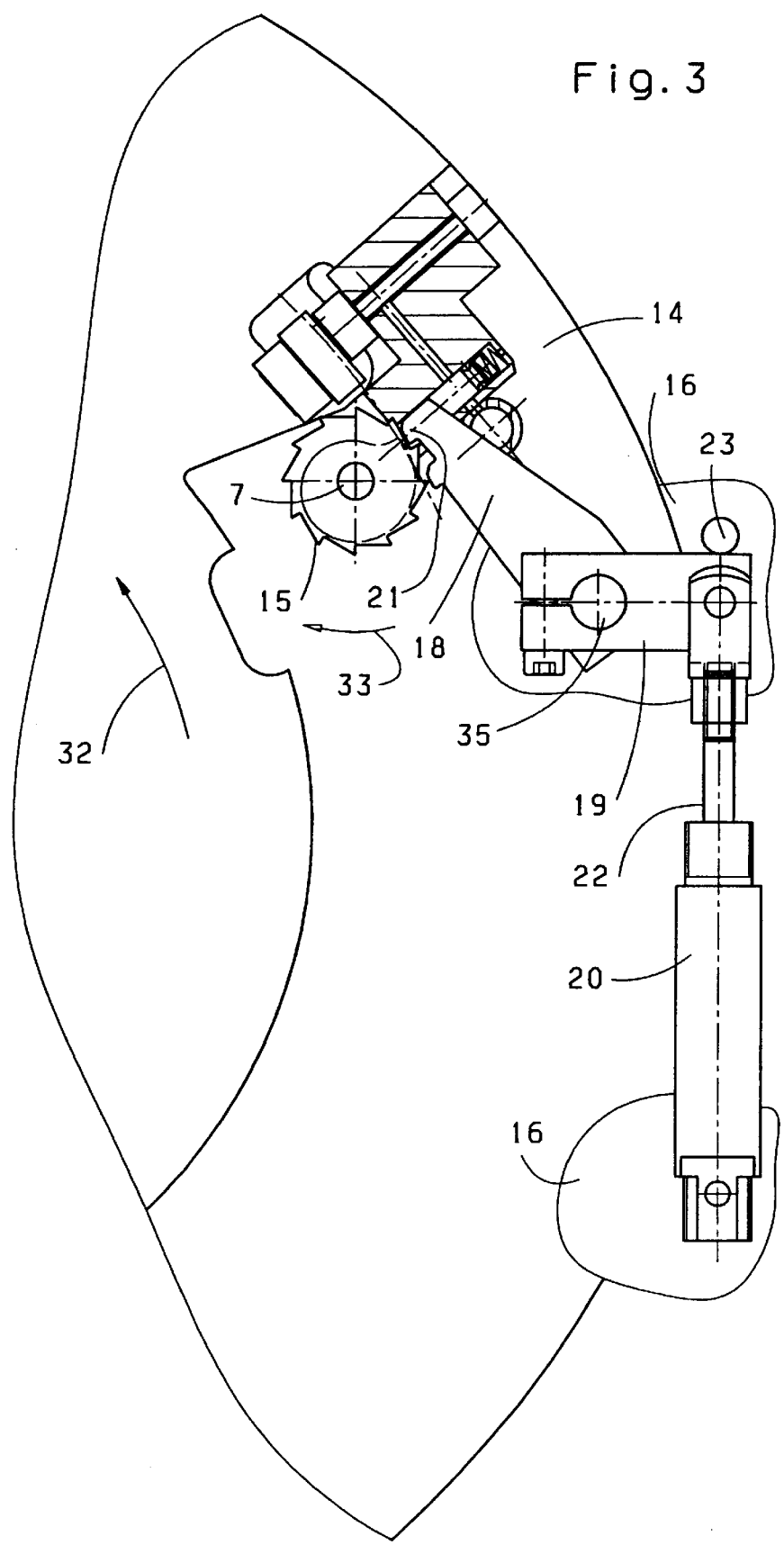
FIG. 3 is a side elevational view, partly in section, of the control device built into a printing-press cylinder, as well as of advantageous embodiments of a step-by-step motion linkage for driving the control device and of a remotely controllable actuating device.

FIG. 3 shows an especially favorable construction of an actuating device, in the form of a geared step-by-step motion linkage that actuates the control device according to the invention. The adjusting shaft 7 is disposed on the cylinder 14 eccentrically to the non-illustrated axis of the cylinder 14 and has a pawl wheel or ratchet wheel 15, which may have a number of teeth corresponding to the number of valves 4 to be actuated. Two levers 18 and 19 secured in a manner that they are fixed against rotation relative to a lever shaft 35, are rotatably supported on the printing-press or machine frame 16. The pawl 21 is formed on the first lever 18, and is accordingly actuated via the second lever 19 by an adjusting device formed as a pneumatic cylinder 20 acting in one direction and being acted upon by overpressure, the pneumatic cylinder 20 having a piston rod 22 engaging with the second lever 19. Instead of a plurality of levers 18 and 19, it is also possible for only one pawl lever 18 or one two-armed pawl lever 18 to be provided. The pneumatic cylinder 20 may be rotatably supported at one end thereof. The rotational angle of the levers 18 and 19 may be limited by a stop element 23, so that the pawl 21 is kept in a first operating position wherein the pneumatic cylinder 20 is acted upon by overpressure, the second lever 19 is at a stop, and the pawl 21 is held in a position wherein an engagement with the ratchet wheel 15 and the actuation thereof can be effected. The overpressure imposed on the pneumatic cylinder is selected to be high enough that the resultant exertion of force of the piston is greater than the force exerted by the ratchet wheel 15 on the levers 18 and 19 upon actuation of the control device, so that the pawl 21 is securely held in engagement at all times. The cylinder 14 is rotationally driven, for example, by the central main drive of the machine or printing press or by a noncentralized drive mechanism of the machine or printing-press assembly which includes the cylinder, so that a defined number of cylinder revolutions takes place which is at a defined ratio to the number of valves 4 to be actuated. As a consequence of the cylinder rotation, the ratchet wheel 15 is swiveled past the pawl 21 that is in the engaged position, the pawl 21 and a tooth of the ratchet wheel 15 mesh, and an incremental actuation of the adjusting shaft 7 ensues, one revolution of the cylinder 14 corresponding to one switching increment or one switched valve 4. With the aid of a non-illustrated spring element, the levers 18 and 19, in the absence of any overpressure being imposed on the pneumatic cylinder 20, can be returned to a second operating position, wherein the pawl 21 is out of engagement, and can be kept in that position. The spring element may then be braced directly on one lever 18, 19, for example, or may be disposed on the piston rod 22 of the pneumatic cylinder 20. Instead of the levers 18 and 19, a linearly adjustable element that has one or more pawls can also be provided. The ratchet wheel 15 may also be connected to the adjusting shaft 7 via a gear mechanism, such as a cone wheel gear. It is also possible to provide a bidirectional pneumatic cylinder instead of the single-directional pneumatic cylinder 20, so that both the initial positioning and the return to the initial position are effected pneumatically. Hydraulic cylinders may also be used. The pneumatic cylinder 20 may be coupled to the lever 19 via a linear guide, for example, including a sliding block guide with a guide path formed on the second lever 19, combined with a slide element mounted on the piston rod 22. It is also possible to provide the remotely-controllable adjusting device as an electromagnetic device, so that the first lever 18 can be held in the engaged position by an electromagnet, for example. It is also possible to use a rotationally acting adjusting device, such as a control motor, instead of the previously mentioned linear acting systems for driving either the levers 18 and 19 or some other type of pawl element. With an arrangement of a plurality of pawls 21 engaging the ratchet wheel 15 one after the other, a so-called multiple pawl, the number of revolutions of the cylinder 14 required to switch a given number of valves 4 can be reduced. The pawls of the multiple pawl may be formed on one common pawl lever. It is also possible for a plurality of pawls to be brought into an engagement position in selective chronological succession. Two pawls, mutually offset 180°, for example, may be assigned to the cylinder 14. Provision may be made for the ratchet wheel 15 to be coaxial with the cylinder axis. The ratchet wheel 15 can then be rotated with respect to the cylinder 14 counter to a comparatively soft-action spring element. The pawl preferably has a comparatively firmer spring support and has an inhibiting or restraining rather than a locking effect. During a cylinder rotation, the ratchet wheel which is in engagement is rotated counter to the action of the spring element. In this regard, the adjusting shaft is actuated incrementally, for example, via a gear. If a limit force is exceeded, the sprung pawl is forced away from the ratchet wheel. The spring element returns the ratchet wheel to the initial position thereof. The adjusting shaft is then not returned to the initial position thereof, for example, because it is hindered by a pawl latch. A pawl resiliently engaging in the ratchet wheel, for example, held in the engaged position by a blocking spring, can be used if provision is made for the cylinder to be turned alternatingly forward and backward several times, without requiring any complete cylinder revolutions. When the cylinder is rotated in a first direction of rotation, the ratchet wheel is actuated, because the pawl is in inhibiting or restraining engagement with a steep tooth side. Upon reverse rotation of the cylinder in a second direction of rotation, the resilient pawl is forced away from the flat rear side of the tooth, out of the engagement position. Furthermore, the possibility of constructing the step-by-step motion linkage as a cam step-by-step motion linkage should also be mentioned. This gear, as shown in the published, non-examined Japanese Patent Application JP 4-153039, for example, may include a grooved cam cylinder disposed on the cylinder 14 and axially parallel therewith on the side surface of the cylinder, and a bolt cylinder disposed in the same manner, the bolt being guided in axially parallel restoring grooves of the grooved cam cylinder and in indexing grooves extending spirally therebetween. The bolt cylinder may be resiliently displaceably supported on a trunnion. At least in given rotational angle positions of the cylinder, when it is not in motion, actuation can be effected by an adjusting device in the form of a linear drive mechanism fixed to the machine or printing-press frame, this drive mechanism moving the bolt cylinder counter to the spring action, the bolt rotating the grooved cylinder via the indexing groove, and the bolt cylinder being restored to the initial position thereof by the spring. The grooved cylinder may be disposed on the adjusting shaft 7 or connected thereto via a gear. A clutch 27 may also be provided, by which either a drive mechanism external to the cylinder 30, for example, including a control motor 28 (FIG. 1), is couplable to step-by-step motion linkage or to the adjusting shaft 7, or the step-by-step motion linkage and the adjusting shaft 7 are couplable to one another in a force-transmitting manner.

We claim:

1. In an apparatus having a cylinder with suction openings and a vacuum source connected to the suction openings, a device for controlling a vacuum applied to the suction openings, comprising:

at least one valve having at least one adjusting body, said at least one valve disposed at the cylinder and between each suction opening and the vacuum source;

a rotatable shaft;

a plurality of adjusting elements disposed between said rotatable shaft and said at least one valve, operatively connecting said rotatable shaft to each of said at least one adjusting body and selectively movable into one of temporary and permanent contact with said at least one adjusting body to actuate said at least one valve when said rotatable shaft is rotated by moving said at least one adjusting body out of a first switching position into a second switching position, the vacuum applied to the suction openings being of different magnitudes in said first switching position and said second switching position.

2. The control device according to claim 1, further including a restraint disengageably connected to said rotatable shaft to hold said rotatable shaft in at least one fixed position.

3. The control device according to claim 1, further including a step motion linkage operatively connected to said rotatable shaft to move said rotatable shaft in fixed increments.

4. The control device according to claim 3, wherein said apparatus has a drive external to the cylinder and a step motion linkage is disposed at the cylinder and drives said rotatable shaft through the drive external to the cylinder.

5. The control device according to claim 3, wherein said step motion linkage is a geared linkage having a ratchet wheel and a pawl.

6. The control device according to claim 5, wherein said ratchet wheel is connected to said rotatable shaft, is disengageably connected to said pawl and is disposed at the cylinder coaxial with a cylinder axis, and said pawl is disposed on a component external to the cylinder and rotates said ratchet wheel if the cylinder rotates.

7. The control device according to claim 6, including a remotely-controllable adjusting device for engaging said pawl with said ratchet wheel.

8. The control device according to claim 3, further including a first engagement element connected to said rotatable shaft, disposed at the cylinder eccentrically to a cylinder axis and rotatable about the cylinder axis, and a second engagement element disposed on a component external to the cylinder.

9. The control device according to claim 8, wherein said first engagement element is a ratchet wheel and said second engagement element is a pawl.

10. The control device according to claim 8, further including a remotely-controllable adjusting device for engaging said second engagement element with said first engagement element.

11. The control device according to claim 10, wherein said adjusting device includes a pneumatic cylinder and at least one lever.

12. The control device according to claim 1, wherein said at least one valve has a valve housing with a hollow chamber, and including at least one line communicating with the suction openings and said hollow chamber and at least one line communicating with the vacuum source and said hollow chamber, and said adjusting body is a displaceable valve body disposed in said hollow chamber.

13. The control device according to claim 12, including an interface disposed at said hollow chamber and between said at least one line communicating with the suction openings and said hollow chamber and said at least one line communicating with the vacuum source and said hollow chamber, said interface defining an intersection opening, and said valve body covering a majority of said intersection opening in said first switching position, and covering a minority of said intersection opening in said second switching position.

14. The control device according to claim 13, wherein said intersection opening includes a suction intersection opening and a vacuum intersection opening, said suction intersection opening being an interface between said hollow chamber and said at least one line communicating with the suction openings and said hollow chamber, said vacuum intersection opening being an interface between said hollow chamber and said at least one line communicating with the vacuum source and said hollow chamber, and said valve body covering a majority of at least one of said suction intersection opening and said vacuum intersection opening in said first switching position and covering a minority of at least one of said suction intersection opening and said vacuum intersection opening in said second switching position.

15. The control device according to claim 12, including an interface disposed at said hollow chamber and between said at least one line communicating with the suction openings and said hollow chamber and said at least one line communicating with the vacuum source and said hollow chamber, said interface defining an intersection opening, and said valve body substantially covering said intersection opening in said first switching position and substantially covering said intersection opening in said second switching position.

16. The control device according to claim 15, wherein said intersection opening includes a suction intersection opening and a vacuum intersection opening, said suction intersection opening being an interface between said hollow chamber and said at least one line communicating with the suction openings and said hollow chamber, said vacuum intersection opening being an interface between said hollow chamber and said at least one line communicating with the vacuum source and said hollow chamber, and said valve body substantially covering at least one of said suction intersection opening and said vacuum intersection opening in said first switching position, and substantially covering at least one of said suction intersection opening and said vacuum intersection opening in said second switching position.

17. The control device according to claim 1, wherein said adjusting elements are cams.

18. In a printing press having a vacuum source and a cylinder having suction openings connected to the vacuum source, a device for controlling a vacuum applied to the suction openings, comprising:

at least one valve having at least one adjusting body, said at least one valve disposed at the cylinder and between each suction opening and the vacuum source;

a rotatable shaft;

a plurality of adjusting elements disposed between said rotatable shaft and said at least one valve, operatively connecting said rotatable shaft to said at least one adjusting body and selectively movable into one of temporary and permanent contact with said at least one adjusting body to actuate said at least one valve when said shaft is rotated by moving said at least one adjusting body out of a first switching position into a second switching position, the vacuum applied to the suction openings being of different magnitudes in said first switching position and said second switching position.

19. In a method for incrementally actuating a device for controlling vacuum applied to suction openings formed in a cylinder, the improvement which comprises:

intermittently cooperating first and second operating elements by adjusting at least one of the first and the second operative elements when the cylinder is rotated;

rotating the cylinder through a defined number of revolutions; and causing the second operative element to actuate the first operative element, which controls the vacuum, based upon cylinder revolution.

20. In a method for incrementally actuating a device for controlling vacuum applied to suction openings of a printing-press cylinder, the improvement which comprises:

providing an actuating device having a first operative element disposed on the cylinder for actuating the device for controlling vacuum, and a second operative element disposed externally to the cylinder, at least one of the first and the second operative elements intermittently cooperable to actuate the vacuum when the cylinder is rotating;

intermittently cooperating the first and second operating elements by adjusting at least one of the first and the second operative elements when the cylinder is rotated;

rotating the cylinder through a defined number of revolutions; and causing the second operative element to actuate the first operative element based upon cylinder revolution.

21. In an apparatus having a cylinder with suction openings and a vacuum source connected to the suction openings, a device for controlling the vacuum applied to the suction openings, comprising:

at least one valve having at least one adjusting body, said at least one valve disposed at the cylinder and between each suction opening and the vacuum source;

a rotatable shaft;

a plurality of adjusting elements disposed between said shaft and said at least one valve, operatively connecting said shaft to said at least one adjusting body and selectively moveable into one of temporary and permanent contact with said at least one adjusting body.

* * * * *